Jan. 2, 1951 M. CAMRAS 2,536,029

MAGNETIC RECORD MEMBER

Filed Dec. 5, 1946

Inventor

Marvin Camras by The Firm of Charles W. Hills Attys.

Patented Jan. 2, 1951 2,536,029

UNITED STATES PATENT OFFICE 2,536,029

MAGNETIC RECORD MEMBER

Marvin Camras, Chicago, Ill., assignor to Armour Research Foundation of Illinois Institute of Technology, Chicago, Ill., a corporation of Illinois Application December 5, 1946, Serial No. 714,286

3 Claims. (Cl. 274—41.4)

This invention relates to a magnetic recorder method and means, and more particularly, to a moving picture film having a novel sound track thereon and to novel apparatus for recording on such a sound track and reproducing a record therefrom.

Many different arrangements have been suggested in the past for making a magnetic record on a moving picture film. One of the biggest problems in connection with making a magnetic record on a moving picture film lies in getting a sound track which is sufficiently large so as to enable a sufficient amount of energy to be recorded on the film without changing the conventional dimensions of a film.

The difficulty has been extremely great in this connection where the sound track was to be used with 8 and 16 mm. film.

One of the principal features and objects of the present invention is to provide a novel sound track arrangement on a moving picture film which will enable sufficient energy to be recorded thereon and reproduced therefrom without enlarging conventional size film.

A further object of the present invention is to provide a novel sound head for an elongated flat record member, such, for example, as a film or tape.

A still further object of the present invention is to provide a novel magnetic recorder method and means.

Another object of the present invention is to provide a novel magnetic record member in which a magnetizable sound track is provided around one edge of a tape or film record member with a portion of the sound track lying on one of the flat surfaces of the tape, while a second portion having magnetic continuity with the first portion lies on an edge surface of the tape or film.

Another and still further object of the present invention is to provide a novel electro-magnetic transducer head having a shoulder portion in the magnetic polar portion over which the record member rides and in which two surfaces at right angles to each other are effective in magnetizing the record member or reproducing a record previously magnetically recorded on the record member.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawing, in which:

Figure 1:
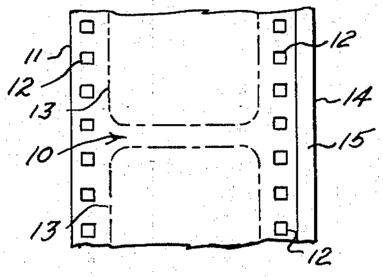
Figure 1 is a diagrammatic sketch of a piece of motion picture film.

While the novel principles of the present invention are not limited to moving picture film, they are particularly applicable to a film such as the film 10 illustrated in Figure 1 of the drawing. This film 10 includes a main body portion 11 formed of cellulose nitrate or cellulose acetate and is provided with a series of sprocket holes 12 which are located between the picture frame 13 and an edge 14 of the film 10.

Figure 2:
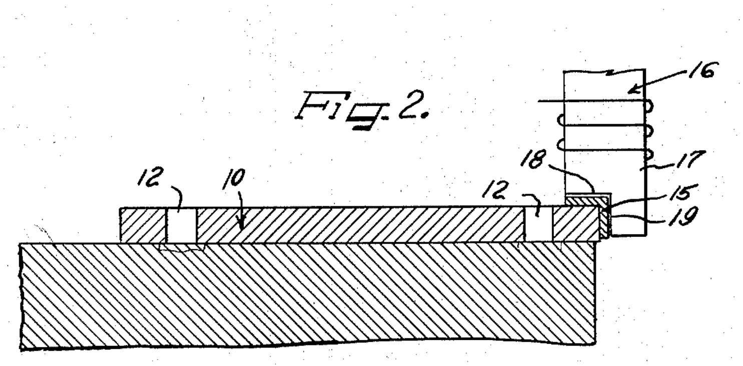
Figure 2 is a vertical sectional view of a film such as that illustrated in Figure 1 riding over an oil-damped flywheel and in engagement with an electro-magnetic transducer head.
Figure 3:
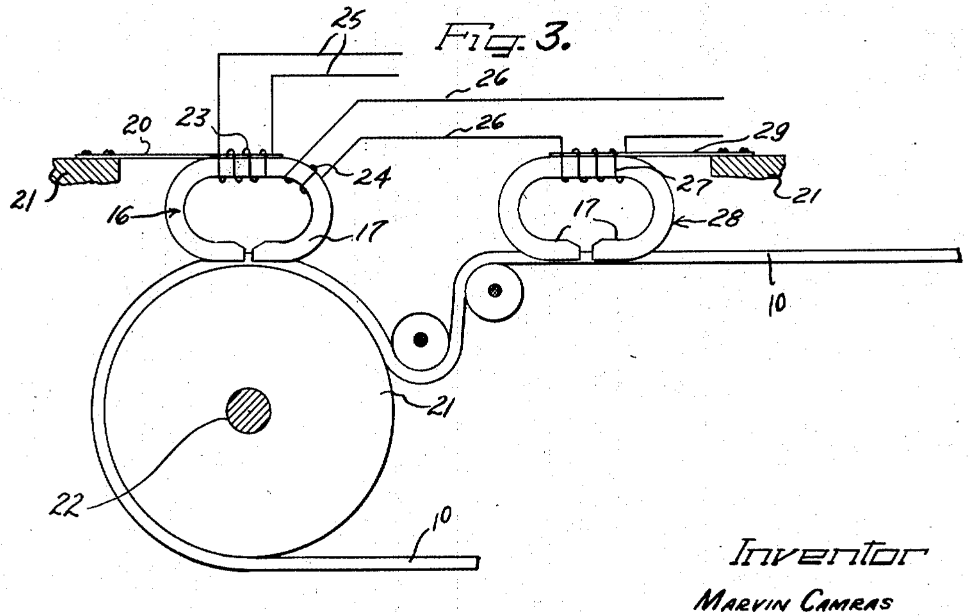
Figure 3 is a diagrammatic side view of an electro-magnetic transducer head and erase head and the film with which they are associated.

As may be seen best in Figure 2 of the drawing, a magnetic sound track 15 is coated over a portion of the upper surface of the film 10 between the sprocket holes 12 and the edge 14 as well as around the adjacent corner and down over the edge surface of the film. This gives a substantial surface area for the magnetic sound track without the disadvantage of having to bring the sound track up to the edge of the sprocket holes 12.

As is well known to those skilled in the art, the punching of the sprocket holes 12 in the film 10 causes a stressing of the film in the immediate region of the sprocket holes which results in a very bad effect on the magnetic sound track 15 when the sound track is brought into this region of stress.

An electro-magnetic transducer head 16 having a pair of polar portions 17 is arranged to ride on the sound track 15 of the film 10. These polar portions 17 include a longitudinally extending shoulder portion 18 having a side wall 19. The shoulder portion 18 is arranged to ride on top of the sound track 15, while the wall portion 19 is arranged to ride against the portion of the sound track 15 which lies over the side edge 14 of the film 10.

The electro-magnetic transducer head 16 is spring-pressed by means of a leaf spring 20 or other suitable mounting mechanism which is carried on a supporting structure 21'. This spring means 20 resiliently urges the head 16 against the film as the film 10 rides over an inertia member 21 mounted for rotation on the axis 22. This inertia member may be an oil damped flywheel or other suitable stabilizing member or capstan.

The electro-magnetic transducer head 16 also includes a signal coil 23 and a high frequency biasing coil 24 which are, respectively, energized through conductors 25 and 26. The high frequency biasing coil 24 is preferably connected in series with an erase coil 27 which is mounted on an erase head 28 similar to the electro-magnetic transducer head 16 but having a slightly larger spacing between the pole portions 17. The erase head 28 is also resiliently mounted on a leaf spring 29 carried on the supporting frame 21'.

It has been found that the above described arrangement and technique is so efficient that satisfactory results may be obtained even on 8 mm. film, notwithstanding the low speed and the extremely small size of the latter. It will also be observed that the inherent nature of the shouldered portions of the head structure is such that the head is self-aligned with the edge of he film.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A magnetic record member comprising a non-magnetic carrier having a coating of a magnetizable material thereon forming two sound track portions, said sound track portions being in thin strips and lying in two planes substantially at right angles to each other forming an L-shape cross-section and having magnetic continuity with each other, one of said sound track portions lying on an edge surface of said carrier and the other sound track portion lying on an adjacent face portion of said carrier, whereby a sufficient amount of energy may be recorded on said non-magnetic carrier for reproduction therefrom.

2. A moving picture film having a line of sprocket holes spaced from one edge thereof and having a coating of magnetizable material thereon forming a magnetic sound track of L-shape cross-section disposed around a corner edge of said film, whereby a sufficient amount of energy may be recorded on said moving picture film for reproduction therefrom.

3. A moving picture film having a line of sprocket holes spaced from one edge thereof and having a coating of magnetizable material thereon forming a magnetic sound track of L-shape cross-section disposed on the side edge surface of said film adjacent said sprocket holes as well as on the marginal main surface of said film over a region extending from said one edge to a point spaced short of said sprocket holes, whereby a sufficient amount of energy may be recorded on said moving picture film for reproduction therefrom.

MARVIN CAMRAS.

REFERENCES CITED

The following references are of record in the file of this patent:

UNITED STATES PATENTS

| Number | Name | Date |
|---|---|---|
| 1,156,976 | Clement | Oct. 19, 1915 |
| 1,466,750 | Peterson | Sept. 4, 1923 |
| 1,883,561 | Chipman | Oct. 18, 1932 |
| 1,883,562 | Chipman | Oct. 18, 1932 |
| 1,949,840 | Languekin | Mar. 6, 1934 |
| 2,210,770 | Muller-Ernesti | Aug. 6, 1940 |